United States Patent Office 3,336,568
Patented Aug. 15, 1967

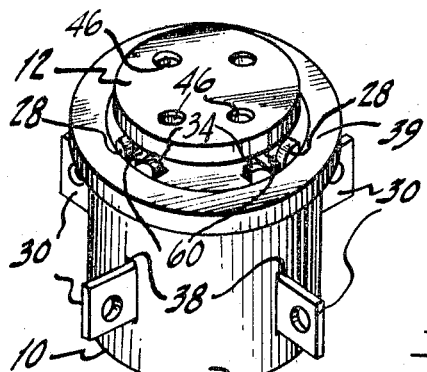
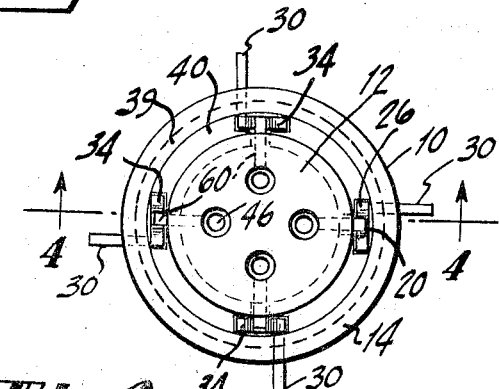
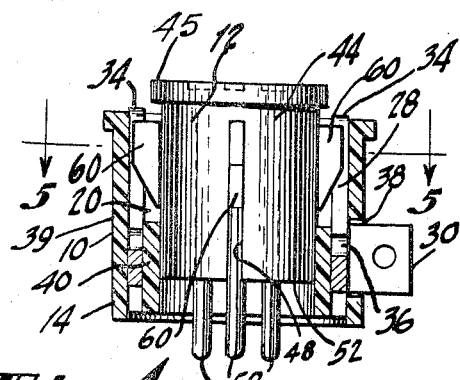
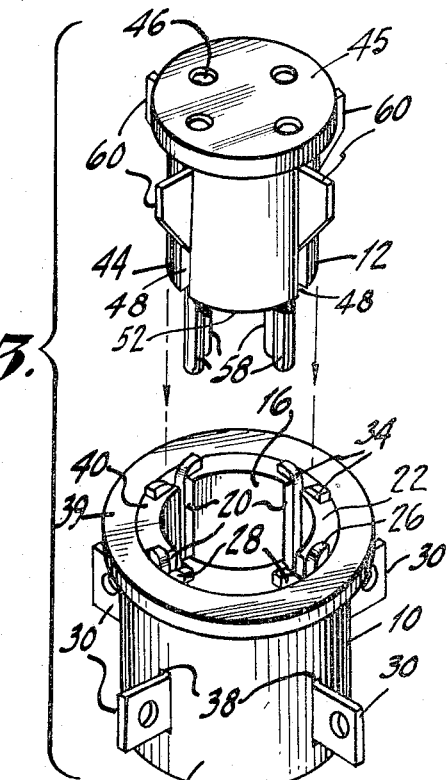
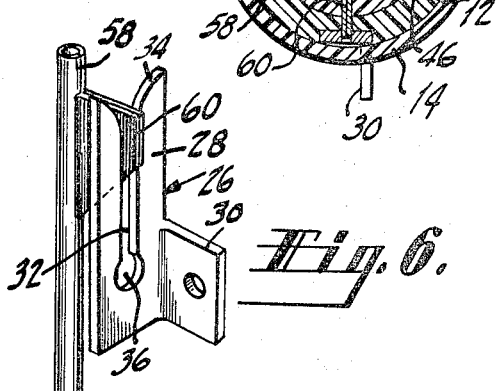

3,336,568
SOCKET FOR ELECTRONIC DEVICES
Lova Plus, South Bound Brook, N.J., assignor to Radio
Corporation of America, a corporation of Delaware
Filed Aug. 27, 1965, Ser. No. 483,041
2 Claims. (Cl. 339—193)

This invention relates to sockets for electronic devices, and particularly to sockets used in apparatus for testing such devices.

In apparatus used, for example, for testing the electrical characteristics of electronic devices, as part of the manufacturing process thereof, it is known to use 2-piece sockets.

Such sockets generally comprise a "receptacle" having terminals which are permanently wired within the test apparatus, and a replaceable "plug" having terminals which frictionally engage contacts in the receptacle. The terminals of the electronic devices to be tested are inserted into contacts in the plug. The advantage of such sockets is that upon wear of the contacts of the plug, after repeated insertions of electronic devices therein, the plug may be readily replaced without the need for rewiring of the test socket or recalibration of the test apparatus.

Heretofore, 2-piece sockets have not been widely used in apparatus for testing certain types of electronic devices, such as transistors having utility in VHF-UHF applications. One reason for this is that the terminals of the plugs add to the effective length of the device lead wires, thereby increasing the inductance associated with the device. This results in a testing of the electronic device under conditions different from the conditions under which the devices are actually used, that is, with their lead wires wired directly into a chassis.

An object of this invention is to provide a novel and improved 2-piece socket especially useful with apparatus for testing VHF-UHF electronic devices.

A further object of this invention is to provide a novel and improved 2-piece socket which adds little or no inductance to the terminals of the device inserted therein, and yet wherein the portions of the socket which are subject to wear are readily replaceable without the need for rewiring or recalibration of the apparatus in which said socket is used.

For achieving these objects, a 2-piece socket is provided comprising a receptacle and an elongated plug. The receptacle is provided with terminal members which extend externally of the receptacle. The terminals are used to wire the socket into a test apparatus or the like. The body of the plug is provided with a plurality of longitudinally extending bores, and a plurality of slots extending from each bore to the outer periphery of the plug body. Received within each bore is a lead receiving member having a flange. The flanges extend through the slots and beyond the outer surface of the side of the plug body. Preferably, the body of the plug is of such size to fit snugly within the tubular receptacle. When the plug is received within the receptacle, the flanges extend into frictional, electrical contact with the receptacle terminals.

In the drawings:

FIG. 1 is a view in perspective of an illustrative 2-piece socket comprising a plug and a receptacle;

FIG. 2 is a plan view of the socket shown in FIG. 1;

FIG. 3 is an exploded view of the socket shown in FIG. 1;

FIG. 4 is an elevational view of the socket shown in FIG. 2, and shows a partial section taken along line 4—4 of FIG. 2;

FIG. 5 is a section taken along line 5—5 of FIG. 4; and

FIG. 6 is a view in perspective showing the engagement of a flange of the plug with the terminal of the receptacle of the socket shown in FIG. 1.

With reference to FIGS. 1 and 3, an illustrative 2-piece socket comprises a receptacle 10, and a plug 12. The receptacle 10 comprises a tubular member 14 having a longitudinally extending right cylindrical bore 16 therethrough. The inner surface of the tubular member 14 is provided with four T-shaped (see FIG. 2) longitudinally extending recesses or grooves 20. The recesses 20 extend from the top surface 22 of the tubular member 14 to about half way down its length. Received within each recess 20 is an electrical contact 26. The contact 26 comprises, as shown in FIG. 6, a vertical leg 28 and a laterally extending leg 30.

The vertical leg 28 is provided with a longitudinally extending slot 32 starting from the top end 34 of the leg 28 and terminating in a stress relieving circular opening 36. When mounted within a recess 20 of the tubular member 14, the vertical leg 28 extends parallel to the longitudinal axis of the tubular member, and the laterally extending leg 30 extends outwardly through a slot 38 in the wall of the tubular member 14. Electrical connections to various test circuits, or the like, are made to the lateral legs 30.

Preferably, the tubular member 14 is made-up of concentric, snugly fitting outer and inner cylinders 39 and 40, respectively, as shown most clearly in FIG. 5. The inner cylinder 40 includes the T-shaped recesses 20 into which the vertical legs 28 of the contacts 26 are received; the outer cylinder 39 includes the slots 38 into which the lateral legs 30 of the contacts 26 are received. In the assembly of tubular member 14, the laterally extending legs 30 of the contacts 26 are passed through the slots 38, the T-shaped slots in the inner cylinder 40 are registered with the vertical legs 28 of contacts 26, and the inner cylinder 40 is press fitted into outer cylinder 39 to lock contacts 26 in place. Preferably, the cylinders 39 and 40 are made of a good radio frequency dielectric plastic-type material such as polytetrafluoroethylene or polyamide.

The plug 12 comprises an elongated right cylindrical body 44 having an outer diameter substantially equal to the diameter of the central bore 16 through the tubular member 14. This provides a snug fit of the plug 12 within the receptacle socket 10. The top end of the body 44 is capped with an enlarged diameter portion or cap 45. Preferably, the body 44 and the cap 45 are integral.

The body 44 and the cap 45 of the plug 12 has four longitudinally extending bores 46 therethrough. Radially extending slots 48 are provided through the body 44 from each bore 46 to the outer curved or side surface of the body 44. The slots 48 extend substantially the entire length of the body 44 from the lower surface 52 thereof. The body 44 is preferably made of a good radio frequency dielectric plastic-type material.

Received within each bore 46 is a lead receiving tubing 58 (see FIG. 5) having a flange 60. The tubing flanges 60 extend radially outwardly through the slots 48 and terminate beyond the outer curved or side surface of the body 44. The tubings 58 are conveniently formed from a T-shaped blank of metal rolled to form a flanged tubular member, shown in FIG. 6. Although not shown, the wall of the tubings 58 have a prong or contact formed therefrom which is bent to extend into the tubing to provide a firm electrical contact with the lead wires or terminals of electrical devices inserted into the tubings. Preferably, the tubings 58 are press fitted within the bores 46.

To assemble the plug 12 into the receptacle 10, the body 44 of the plug is aligned with the cylindrical bore 16 of the receptacle, and each flange 60 is aligned with a corresponding recess 20. The plug is inserted into the receptacle and each flange 60 enters into a recess 20 and into a slot 32 of the contacts 26, as shown best in FIGS. 5 and 6. A snug fit is provided between the flanges 60 and the contacts 26, thereby providing a firm electrical contact between the tubings 58 and the contacts 26. The body 44 of the plug 12 fits snugly within the central bore 16 of the receptacle 10, as mentioned, thus providing a rigid socket assembly. The socket assembly is mounted in a chassis in a known manner, such as being press fitted into a circular opening in a chassis plate having slots to permit passage of contact legs 30. Also, although not shown, a dust shield comprising an annular member is preferably mounted on the top surface 22 of the receptacle 10 in snug engagement with the cap 45 of the plug 12.

In the testing of an electronic device such as a transistor, not shown, having four lead wires, the lead wires are inserted into the tubings 58 in the plug 12. As mentioned, firm electrical contact is made between the tubings 58 and the lead wires inserted therein, thereby electrically connecting the transistor lead wires with the contacts 26 of the receptacle 10. Contacts 26 may be wired, for example, to the test circuits of a test apparatus.

Upon excessive wear of the tubings 58 of the plug 12 due to repeated insertions of the lead wires or terminals of electronic devices therein, the plug 12 is removed and replaced with a new plug. Rewiring and resoldering of the test socket, and recalibration of the test apparatus are not required. To facilitate removal of the plug 12 from within the receptacle 10, the upper end of the wall of the cylinder 40 may be provided with notches (not shown) permitting insertion of the ends of a grasping tool beneath the cap 45 of the plug 12.

The flanges 60 are adjacent to the top end of tubings 58 and thus provide a short electrical path between the electrical device and the contacts 28 wired to the test circuits. The effective length of the device leads or terminals is thus not increased and there is no increase of the lead or terminal inductance. Further, because of the divergence of the flanges 60 with respect to one another, there is little increase in interlead capacitance. Thus, use of plural-type sockets of the type described provides testing of electronic devices under substantially the same conditions as the electronic devices are used.

What is claimed is:
1. A socket for a device having extending leads, said socket comprising a receptacle and a plug,
said receptacle comprising snugly fitting outer and inner cylinders, said inner cylinder having slots through the wall thereof extending from one end of said inner cylinder,
contacts disposed between said cylinders in registry with said slots, said contacts being provided with terminal members extending through the wall of said outer cylinder,
said plug comprising an elongated body having a plurality of longitudinally extending bores therethrough, said body being slotted from each of said bores to the outer side surface of said body,
a lead receiving member within each of said bores, said member including a flange extending through said slots and beyond said outer surface of said body,
means for mounting said plug within said receptacle, and
said flanges extending into said receptacle slots and being engaged with said contacts when said plug is mounted within said receptacle.

2. A socket for a device having extending leads, said socket comprising a receptacle and a plug, said plug fitting snugly within said receptacle,
said receptacle comprising outer and inner snugly fitting right cylinders, said inner cylinder having slots through the wall thereof, said slots extending longitudinally from one end of said cylinders,
contacts disposed between said cylinders in registry with said slots, said contacts being provided with terminal members extending outwardly through and beyond the wall of said outer cylinder,
said plug comprising a right cylindrical body having a plurality of longitudinally extending bores therethrough, said plug body being slotted from each of said bores to the outer cylindrical surface of said body,
a lead receiving tubing within each of said plug bores, each of said tubings having a flange extending outwardly through said slots and beyond said outer surface of said body,
said flanges extending into said receptacle slots and engaging said contacts when said plug is received within said receptacle.

References Cited
UNITED STATES PATENTS 2,774,949  12/1956  Cardani et al. _____ 339—193

FOREIGN PATENTS 903,852  8/1962  Great Britain.

MARVIN A. CHAMPION, *Primary Examiner.*

J. R. MOSES, *Assistant Examiner.*